United States Patent
Kincaid et al.

(10) Patent No.: US 9,809,238 B2
(45) Date of Patent: Nov. 7, 2017

(54) COMPACT PORTABLE COOLING CONTAINER AND KEG DISPENSER

(71) Applicants: David A. Kincaid, Atlanta, GA (US); Tim Kalbas, Atlanta, GA (US); Dan Wirtz, Atlanta, GA (US); Allen Broughton, Atlanta, GA (US); Sean McLaren, Atlanta, GA (US); Ian Mackay, Atlanta, GA (US)

(72) Inventors: David A. Kincaid, Atlanta, GA (US); Tim Kalbas, Atlanta, GA (US); Dan Wirtz, Atlanta, GA (US); Allen Broughton, Atlanta, GA (US); Sean McLaren, Atlanta, GA (US); Ian Mackay, Atlanta, GA (US)

(73) Assignee: Pik Six LLC, Atlanta, GA (US)

( * ) Notice: Subject to any disclaimer, the term of this patent is extended or adjusted under 35 U.S.C. 154(b) by 0 days.

(21) Appl. No.: 15/007,269

(22) Filed: Jan. 27, 2016

(65) Prior Publication Data
US 2016/0214633 A1    Jul. 28, 2016

Related U.S. Application Data

(60) Provisional application No. 62/108,613, filed on Jan. 28, 2015.

(51) Int. Cl.
| | | |
|---|---|---|
| *B60P 3/22* | (2006.01) | |
| *B62B 1/26* | (2006.01) | |
| *B62B 5/06* | (2006.01) | |
| *B65D 25/28* | (2006.01) | |
| *B65D 77/04* | (2006.01) | |
| *B65D 81/38* | (2006.01) | |
| *B65D 45/02* | (2006.01) | |

(Continued)

(52) U.S. Cl.
CPC ............... *B62B 1/264* (2013.01); *B62B 5/06* (2013.01); *B65D 25/2852* (2013.01); *B65D 45/02* (2013.01); *B65D 77/0493* (2013.01); *B65D 81/3886* (2013.01); *B65D 25/205* (2013.01); *B65D 25/2897* (2013.01); *B67D 1/0804* (2013.01); *B67D 2210/00133* (2013.01)

(58) Field of Classification Search
CPC ....... B62B 1/264; B62B 5/06; B65D 25/2852; B65D 77/0493; B65D 81/3886; B65D 25/205; B65D 25/2897; B67D 1/0804; B67D 2210/00133
USPC ....... 222/608, 538, 539, 526, 530, 533, 534, 222/535; 220/592.01, 592.09, 592.1, 220/592.18, 592.19, 592.2, 592.25, 752, 220/755, 756, 759, 761, 762, 763, 764, 220/768, 769, 770, 773, 774; 16/110.1, 16/421, 430
See application file for complete search history.

(56) References Cited

U.S. PATENT DOCUMENTS

| | | | | | |
|---|---|---|---|---|---|
| 519,534 | A | * | 5/1894 | James .................. | B65D 47/305 |
| | | | | | 137/579 |
| 1,477,742 | A | * | 12/1923 | Wright ..................... | B25G 3/02 |
| | | | | | 16/110.1 |

(Continued)

*Primary Examiner* — Patrick M Buechner
*Assistant Examiner* — Michael J Melaragno
(74) *Attorney, Agent, or Firm* — Atlanta Technology Law; Luke Anderson

(57) ABSTRACT

The present invention is directed to a fully self contained, portable apparatus specifically designed for storing, cooling, transporting both upright or on the side, and dispensing a beverage, such as beer, from a Sixth barrel of Cornelius keg.

12 Claims, 19 Drawing Sheets

(51) Int. Cl.
*B67D 1/08* (2006.01)
*B65D 25/20* (2006.01)

(56) References Cited

U.S. PATENT DOCUMENTS

| | | | | |
|---|---|---|---|---|
| 1,532,016 A * | 3/1925 | Wright | ............... | A47J 41/022 217/125 |
| 2,003,050 A * | 5/1935 | Iselin | ............... | F25D 3/02 222/131 |
| 2,060,941 A * | 11/1936 | Kline | ............... | B65D 7/045 220/592.2 |
| 2,060,942 A * | 11/1936 | Kline | ............... | B65D 15/02 220/592.19 |
| 2,104,467 A * | 1/1938 | Marzolf | ............... | B67D 1/04 220/314 |
| 2,182,116 A * | 12/1939 | Copeman | ............... | B67D 1/06 220/592.19 |
| 2,259,852 A * | 10/1941 | Hall | ............... | B67D 1/06 62/376 |
| 2,516,728 A * | 7/1950 | Smith | ............... | B65D 25/42 220/768 |
| 2,626,200 A * | 1/1953 | Patch | ............... | B67D 1/0861 220/592.19 |
| 2,722,137 A * | 11/1955 | Russell | ............... | G05G 1/06 16/430 |
| 2,786,606 A * | 3/1957 | Dushek | ............... | B67D 3/00 137/616 |
| 2,792,692 A * | 5/1957 | Bryan | ............... | B67D 1/04 222/146.6 |
| 2,828,055 A * | 3/1958 | Pearson | ............... | B65D 47/068 222/513 |
| 2,917,906 A * | 12/1959 | Woolley | ............... | F25D 3/06 222/146.6 |
| 2,961,283 A * | 11/1960 | Hennion | ............... | A47B 69/00 312/311 |
| 3,130,443 A * | 4/1964 | Tonelli | ............... | B62B 5/06 16/110.1 |
| 3,178,896 A * | 4/1965 | Sandsto | ............... | F25B 21/02 62/3.64 |
| 3,180,529 A * | 4/1965 | Buffington | ............... | F25D 11/00 222/131 |
| 3,232,489 A * | 2/1966 | Buffington | ............... | B67D 1/06 211/150 |
| 3,232,491 A * | 2/1966 | Hunt | ............... | B65D 81/3827 217/52 |
| 4,042,142 A * | 8/1977 | Ruano | ............... | A47G 23/04 220/4.21 |
| 4,071,160 A * | 1/1978 | Vick | ............... | B65D 81/3886 206/514 |
| 4,164,853 A * | 8/1979 | McDonough | ............... | F25D 3/06 222/108 |
| 4,220,048 A * | 9/1980 | Grepiotis | ............... | B67D 1/02 62/125 |
| 4,242,884 A * | 1/1981 | Kotschwar | ............... | F25D 3/08 220/592.19 |
| 4,291,814 A * | 9/1981 | Conn | ............... | B65D 77/28 215/229 |
| 4,350,267 A * | 9/1982 | Nelson | ............... | B67D 1/06 222/131 |
| 4,431,326 A * | 2/1984 | Braithwaite | ............... | B05C 17/002 220/254.7 |
| 4,481,791 A * | 11/1984 | German | ............... | B67D 1/0857 62/400 |
| 4,483,157 A * | 11/1984 | Human | ............... | B67D 1/0857 62/400 |
| 4,519,219 A * | 5/1985 | Prepodnik | ............... | F25D 3/06 206/519 |
| 4,633,678 A * | 1/1987 | Lea | ............... | B67D 1/0857 220/592.19 |
| 4,642,999 A * | 2/1987 | Justice | ............... | B65D 81/3879 220/4.26 |
| 4,655,365 A * | 4/1987 | Miller | ............... | F16J 13/18 105/377.07 |
| 4,699,282 A * | 10/1987 | Farrar | ............... | B65D 81/38 206/459.5 |
| 4,724,681 A * | 2/1988 | Bartholomew | ............... | F25D 3/06 190/18 A |
| 4,802,344 A | 2/1989 | Livingston | | |
| 4,844,300 A * | 7/1989 | Simons | ............... | B67D 1/06 222/108 |
| 4,873,841 A * | 10/1989 | Bradshaw | ............... | A45C 5/14 280/47.17 |
| 5,012,553 A * | 5/1991 | Hardigg | ............... | B65D 25/2841 16/445 |
| 5,044,514 A * | 9/1991 | Portat | ............... | B65D 11/16 220/23.87 |
| 5,129,552 A * | 7/1992 | Painchaud | ............... | B67D 1/06 222/146.6 |
| 5,203,468 A * | 4/1993 | Hsu | ............... | A47G 19/2272 220/254.3 |
| 5,282,561 A | 2/1994 | Mihalich | | |
| D366,599 S * | 1/1996 | Brown | ............... | D7/605 |
| 5,683,097 A * | 11/1997 | Fenton | ............... | A45C 5/14 280/47.26 |
| 5,803,472 A * | 9/1998 | Lien | ............... | A45C 5/14 108/129 |
| 5,860,527 A * | 1/1999 | Frankenberg | ............... | B65D 1/22 206/509 |
| 5,904,269 A * | 5/1999 | Wolff | ............... | B65D 25/2852 220/756 |
| 5,956,966 A * | 9/1999 | Wendell | ............... | B67D 1/0857 62/389 |
| 6,010,043 A * | 1/2000 | Williamson | ............... | B67D 1/06 222/129.1 |
| 6,131,972 A * | 10/2000 | Whitehead | ............... | B25G 1/102 16/430 |
| 6,311,991 B1 * | 11/2001 | Conrado | ............... | A45C 5/14 280/47.26 |
| 6,328,320 B1 * | 12/2001 | Walski | ............... | B65F 1/1468 220/908 |
| 6,364,329 B1 * | 4/2002 | Holub | ............... | A45C 5/14 280/47.26 |
| 6,446,988 B1 * | 9/2002 | Kho | ............... | A45C 5/14 16/405 |
| 6,454,131 B1 * | 9/2002 | Van Der Meer | ............... | B67D 1/0462 222/105 |
| 6,467,779 B1 * | 10/2002 | Mills | ............... | A01K 97/06 224/922 |
| 6,481,238 B1 | 11/2002 | Jennings | | |
| 6,783,034 B1 * | 8/2004 | Brent | ............... | B67D 1/0418 222/183 |
| 7,246,727 B2 * | 7/2007 | Magermans | ............... | B67D 1/0412 222/529 |
| 7,500,622 B2 * | 3/2009 | Golding | ............... | B65D 25/30 220/711 |
| 7,584,873 B2 * | 9/2009 | Grittmann | ............... | B67D 1/0418 222/394 |
| 7,735,334 B2 | 6/2010 | Johnson | | |
| 7,757,908 B1 | 7/2010 | Buhl, Jr. | | |
| 7,861,892 B1 | 1/2011 | White et al. | | |
| 8,087,526 B2 * | 1/2012 | Dovey | ............... | B65D 11/06 220/4.08 |
| 8,424,901 B2 * | 4/2013 | Vanderberg | ............... | B62B 3/10 280/47.18 |
| 8,544,648 B2 * | 10/2013 | Cleveland | ............... | B65D 21/0223 206/503 |
| 8,690,028 B2 * | 4/2014 | Risheq | ............... | C02F 1/003 222/158 |
| D732,327 S * | 6/2015 | Ciuksza, Jr. | ............... | D7/300 |
| 9,156,671 B2 * | 10/2015 | Taylor | ............... | B67D 1/0801 |
| 9,389,010 B1 * | 7/2016 | Booker, Sr. | ............... | B62B 3/02 |
| 2004/0025531 A1 * | 2/2004 | Holloman-Hughes | ............... | A45C 11/20 62/457.7 |
| 2004/0222231 A1 * | 11/2004 | Aiken | ............... | B65F 1/1468 220/759 |
| 2004/0232158 A1 * | 11/2004 | Aiken | ............... | B65F 1/1468 220/759 |

(56) References Cited

U.S. PATENT DOCUMENTS

| | | | |
|---|---|---|---|
| 2006/0011664 A1* | 1/2006 | Hammond | B67D 1/0406 222/399 |
| 2006/0283879 A1* | 12/2006 | Rasmussen | B67D 1/0001 222/81 |
| 2007/0084883 A1* | 4/2007 | Magermans | B67D 1/0412 222/400.7 |
| 2008/0006051 A1* | 1/2008 | Johnson | F25D 31/006 62/371 |
| 2008/0016653 A1* | 1/2008 | Baradzi | B25G 1/102 16/430 |
| 2008/0156805 A1* | 7/2008 | Perry | B65D 25/2897 220/361 |
| 2008/0156806 A1* | 7/2008 | Perry | B65D 25/2897 220/361 |
| 2008/0156808 A1* | 7/2008 | Perry | B65D 25/2897 220/560.03 |
| 2008/0156858 A1* | 7/2008 | Perry | B65D 25/2897 229/104 |
| 2008/0264953 A1* | 10/2008 | Lowman | B67D 1/0406 220/592.19 |
| 2009/0032556 A1* | 2/2009 | Zwahlen | B65D 25/46 222/534 |
| 2009/0044561 A1* | 2/2009 | Dalton | B67D 1/06 62/398 |
| 2009/0108031 A1* | 4/2009 | Anderson | B67D 1/0839 222/394 |
| 2009/0206099 A1* | 8/2009 | Davis | A47G 23/0225 220/739 |
| 2010/0078441 A1* | 4/2010 | Barnett | A45C 13/36 220/592.2 |
| 2010/0308066 A1* | 12/2010 | Perry | B65D 25/2897 220/810 |
| 2010/0326123 A1* | 12/2010 | Johnson | F25D 31/006 62/457.9 |
| 2012/0035991 A1* | 2/2012 | Fiorito | B65D 23/14 705/14.1 |
| 2012/0132657 A1* | 5/2012 | Seiders | B65D 81/3816 220/592.2 |
| 2012/0223067 A1* | 9/2012 | Gaynor | A47J 36/10 219/438 |
| 2012/0241345 A1* | 9/2012 | Blakeman | A45C 5/08 206/457 |
| 2012/0305571 A1* | 12/2012 | Larsen | B65D 81/3886 220/592.17 |
| 2012/0325856 A1* | 12/2012 | Ito | B67D 1/0857 222/146.6 |
| 2013/0056484 A1* | 3/2013 | Lu | B65D 65/40 220/739 |
| 2013/0193673 A1* | 8/2013 | Vanderberg | B62B 3/16 280/655 |
| 2013/0200581 A1* | 8/2013 | Vanderberg | B62B 5/0083 280/30 |
| 2013/0207359 A1* | 8/2013 | Vanderberg | A45C 5/146 280/30 |
| 2013/0207360 A1* | 8/2013 | Vanderberg | A45C 5/14 280/30 |
| 2013/0214501 A1* | 8/2013 | Vanderberg | B62B 5/0083 280/30 |
| 2013/0241242 A1* | 9/2013 | Carter | B60R 3/005 296/203.01 |
| 2014/0217126 A1* | 8/2014 | Peirsman | B67D 1/0004 222/399 |
| 2014/0227401 A1* | 8/2014 | Kounlavong | A47J 27/09 426/231 |
| 2016/0214633 A1* | 7/2016 | Kincaid | B62B 1/264 |

\* cited by examiner

COMPACT PORTABLE COOLING CONTAINER AND KEG DISPENSER

CROSS REFERENCE TO RELATED APPLICATION

This non-provisional application claims priority to the provisional application Ser. No. 62/108,613 filed on Jan. 28, 2015, which is fully incorporated herein by reference.

FIELD OF THE INVENTION

This invention relates to beverage dispensers, and more particularly, to a portable, cooled container and dispenser for a Sixth Barrel or Home Brew (Cornelius) keg of beer or other beverage.

BACKGROUND OF THE INVENTION

Commercial Kegs: Commercial beer kegs are available in four sizes: Half Barrel, Quarter Barrel, Slim Quarter Barrel and Sixth Barrel. These kegs are also referred to as a Full-Keg, Pony Keg (a shorter version of the full-keg, but same diameter), Slim Quarter and Torpedo Keg (43% narrower than a full-keg but the same height). The approximate full weight and number of drinks in each are as follows:

Half Barrel: 160 pounds/165.33-12 oz. drinks
Quarter Barrel/Slim Quarter: 90 pounds/82-12 oz. drinks
Sixth Barrel: 55 pounds/56-12 oz. drinks (60 cans of beer)

The majority of commercial beer kegs sold each year are half barrels. However, the sixth barrel keg is becoming the choice for many establishments, breweries and consumers that wish to use kegs smaller than a half barrel. The small footprint of a sixth barrel allows retailers to have a greater variety of beer in a small space. For the consumer, at approximately 34% the weight of a half-barrel, the sixth barrel provides a more convenient way to enjoy keg beer at home. In addition, consumers are finding more reasons to purchase sixth barrels given their smaller quantity of beer.

The Influence of Craft Beers: The popularity of the sixth barrel kegs is growing in response to the growth of craft beers. Craft beer generally refers to beer that is brewed using traditional methods, without adjuncts such as rice or corn, and focuses on flavor, creativity and originality rather than mass appeal. In the past decade, craft beers have gained in popularity in the brewing industry. According to the American Brewers Association, total beer sales dropped 1.9% in 2013. However, craft beer sales grew 17.2%. In addition, craft beer's share of the total U.S. beer market in dollars grew to more than 14% in 2013, up from 10% in 2012.

Craft beers typically cost much more then mass-produced beers. In addition, studies have shown consumers drink less beer when drinking a craft versus a mass-produced beer due to the often higher alcohol content and fuller body of the craft beer. Due to these facts and its convenient size, establishments and consumers often purchase craft beer in the sixth barrel to avoid the costly impact of the beer going bad before it is consumed.

Craft beer breweries have responded by making the majority of craft beers available for purchase in the sixth barrel size. In addition, mass produced breweries are making their more popular brands available in the sixth barrel to compete with the crafts.

The convenient size and quantity of beer in the sixth barrel coupled with the craft beer trends are driving a change in the keg marketplace. Today, sixth barrels are more abundant than ever and are generally available at your local liquor store.

Home Brewing: According to the American Homebrewers Association, there are an estimated 1.2 million home-brewers in the United States. There are two primary methods for containing home brewed beer, bottles and kegs. The Cornelius keg is designed for the home brewer and is similar in size and shape to the sixth barrel. Storing homebrew in a keg is often preferred due to the ease of kegging beer rather than bottling.

Given the popularity and portability of the sixth barrel and Cornelius keg, it stands to reason that an ideal apparatus would be a portable container for storing, cooling and dispensing these type of kegs.

SUMMARY OF THE INVENTION

In view of the foregoing background, it is therefore an object of the present invention to provide a portable container and dispenser specifically designed to hold securely in place a Sixth Barrel or Cornelius keg. These and other objects, features, and advantages of the invention are provided by an insulated container with a housing defining an interior space. The exterior and interior are made of a durable material.

The present invention includes a waterproof lid with a latch for locking the lid to the container. A hinged faucet mechanism is located on the top of the container which folds up when in use and down during transport or storage. When placed in the down position, the faucet tucks into a groove on the top of the container providing protection during transport. When the mechanism is in the upright position, the faucet extends vertically wherein the handle is pivoted forward to dispense beer, and back to the vertical position when dispensing is complete. Also on the top section is a removable drip tray located underneath the faucet for catching excess liquid during use.

The present invention includes a mechanism for holding a Sixth Barrel or Cornelius keg firmly in its center eliminating the ability for the keg to move side to side, or up and down within the container. In order to accomplish this, the inside base of the container is equipped with various molded tracks designed to correspond to the bottom of the Sixth Barrel and Cornelius kegs. As these kegs are placed into the container, the molded tracks hold the base of the keg and secure it within the center of the container. The inside top of the container has molded tracks that correspond to the top of the Sixth Barrel and Cornelius kegs. When these kegs are placed within the container and the top is closed, the keg is clamped into the center of the container, held in place by the inside bottom molded tracks and inside top molded tracks of the container. This feature also creates a consistent thickness between the keg and the inside walls of the container. This space is used for placing ice evenly around the keg within the container.

The present invention further includes a tap (not shown) located inside the container for connecting to the keg. A single-gauge pressure adjusting regulator and disposable carbon dioxide cartridge are provided to control the flow of beer to the faucet. The regulator and carbon dioxide are attached on the outside of the container for easy access and are protected by a hinged door that opens and closes. Plastic tubing connects the tap, regulator, and faucet.

For moving the container, two wheels are connected to a rectilinear and elongated axle extending through the container at the bottom and outward. In addition, a pull handle is located on the same side of the container as the wheels and extends above the top. Furthermore, handles are located on the sides of the container.

A drain cock directly conjoined to the side of the container can be opened or closed to allow liquid resulting from condensation or during cleaning to be removed from the container.

DETAILED DESCRIPTION

Figure 1:
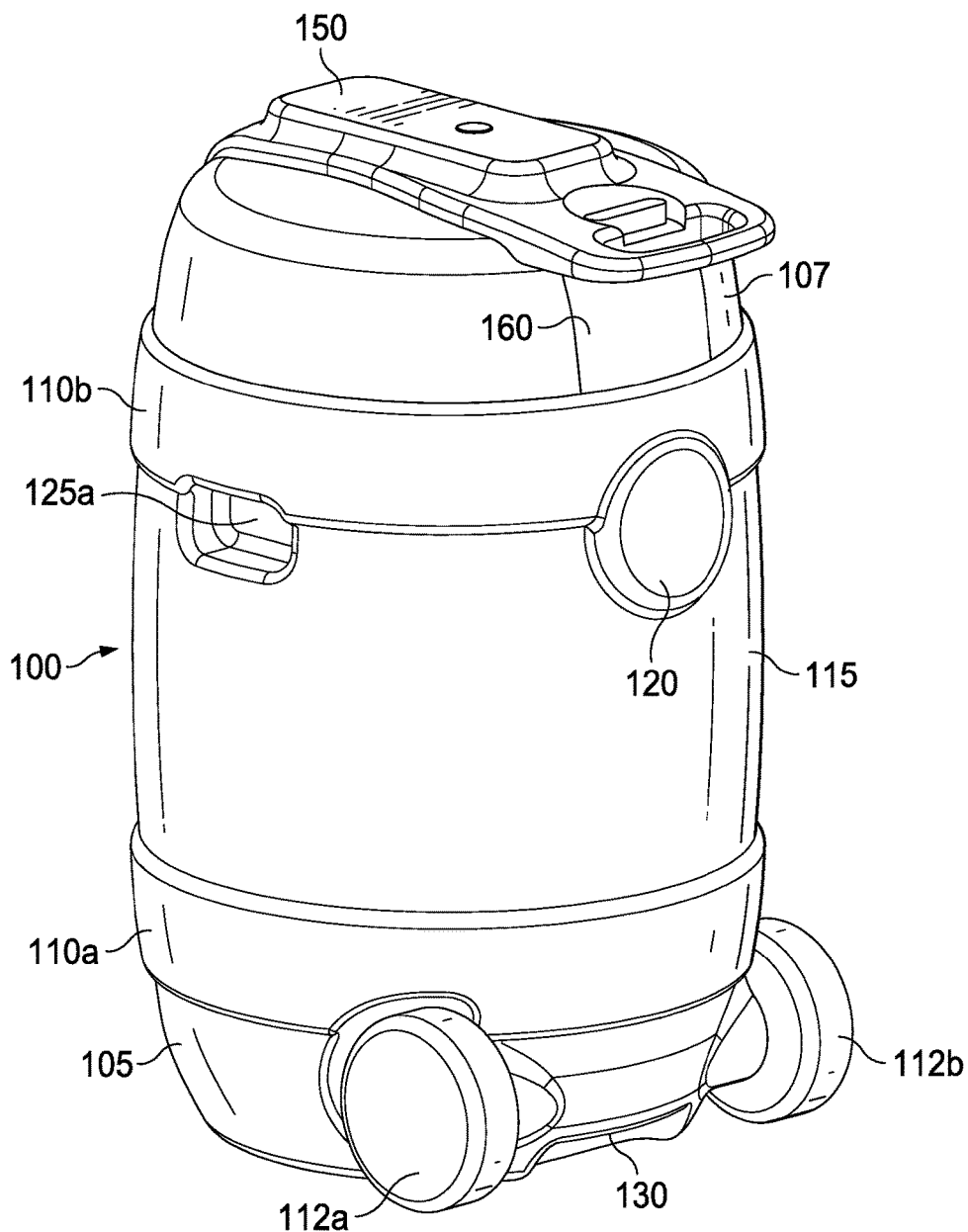
FIG. 1 is a top perspective view of the entire portable container with the handle in the down locked position.
Figure 2:
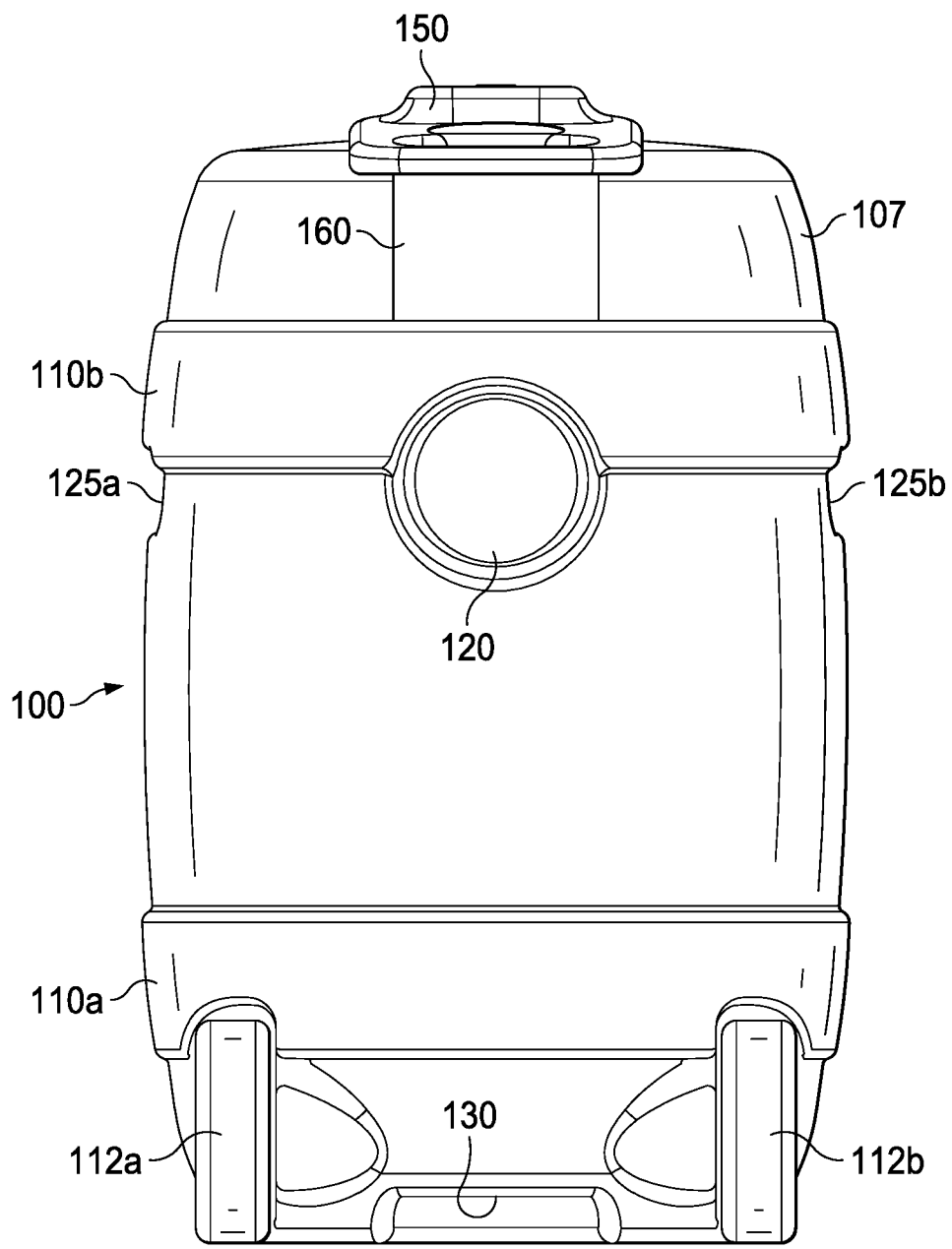
FIG. 2 is a front view of the entire portable container showing the wheels and the circular plaque mounting location on the side of the portable container.
Figure 3:
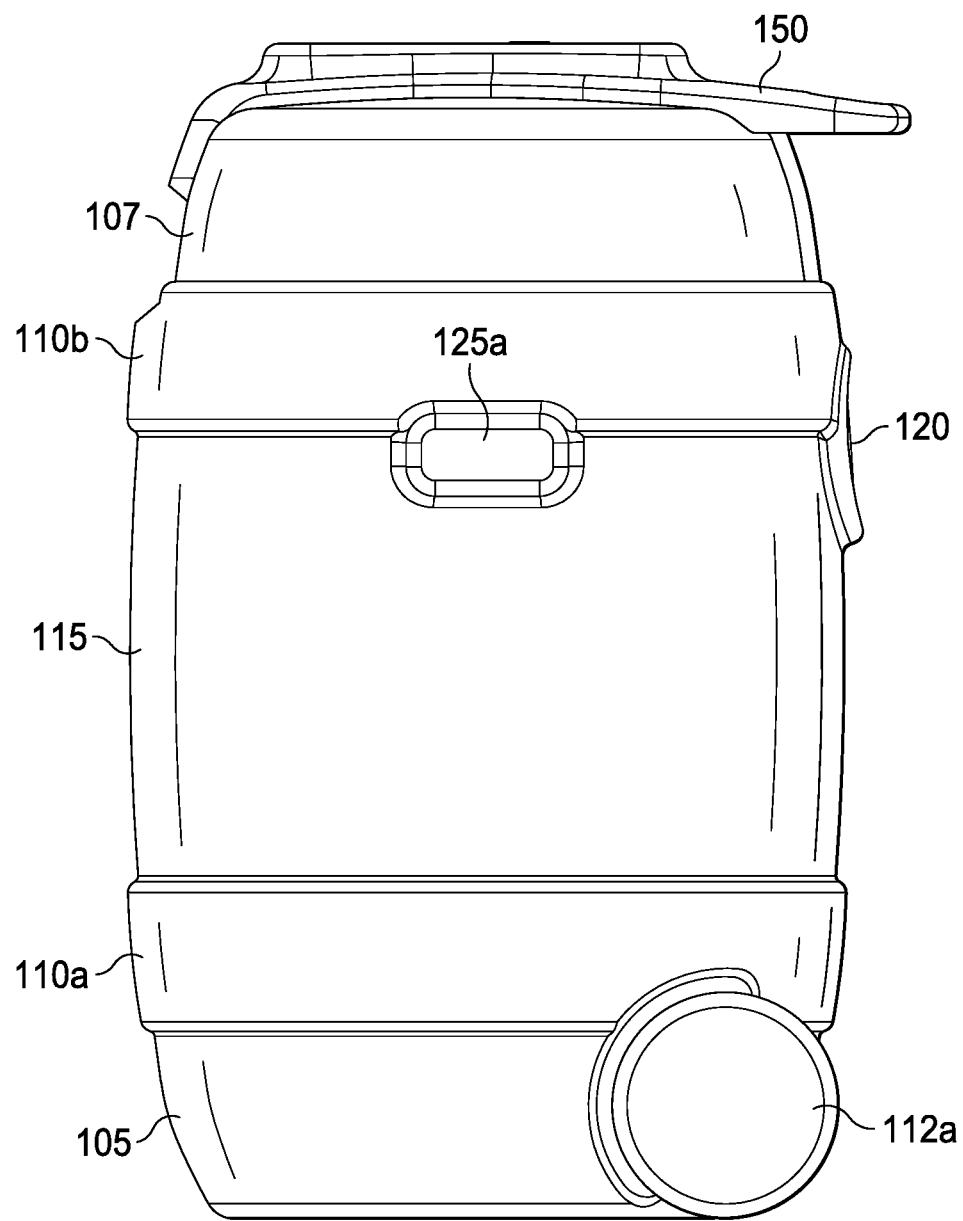
FIG. 3 is a symmetrical side view of the entire portable container with the left side view being a mirror image of the right side view.
Figure 4:
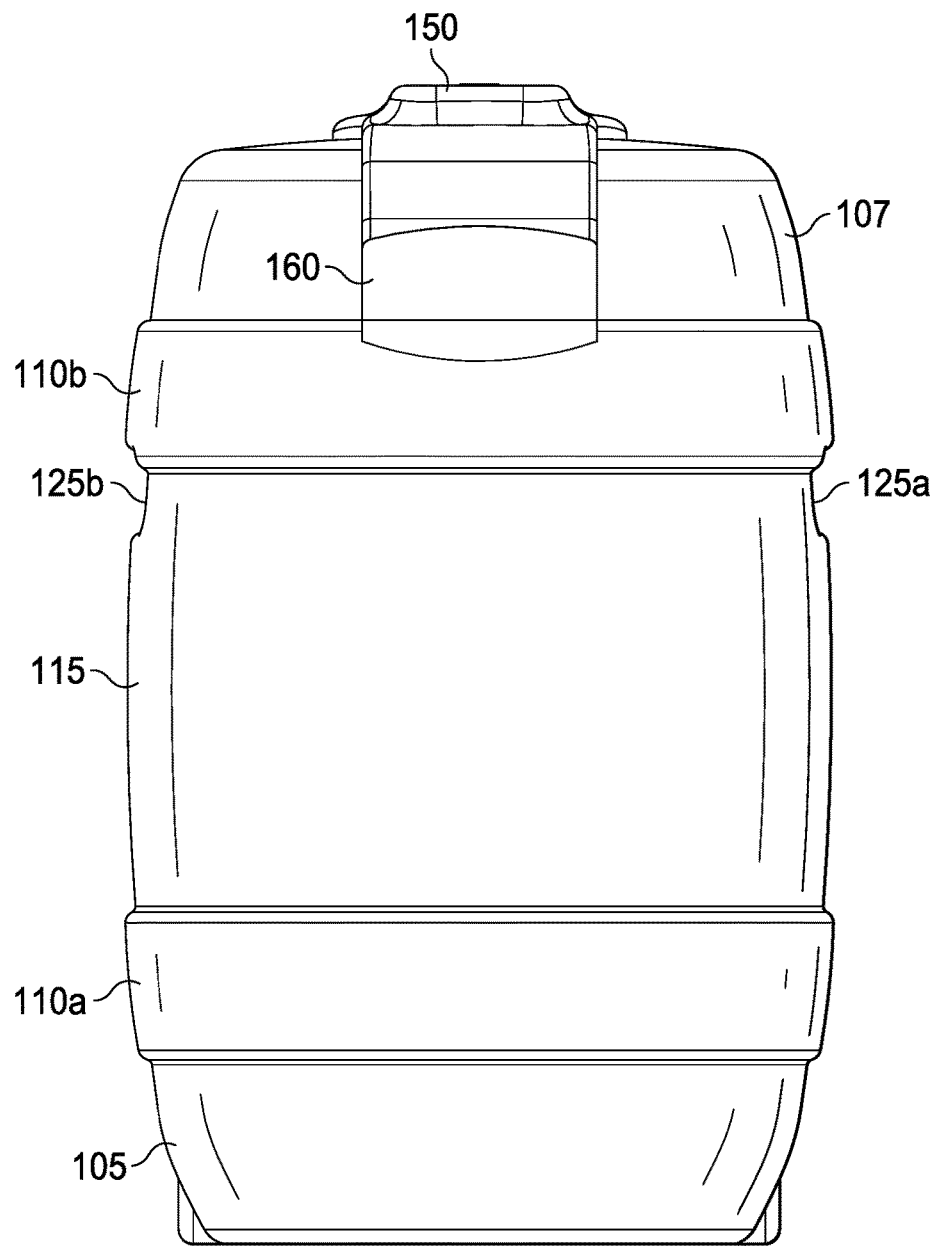
FIG. 4 is a back view of the entire portable container showing the handle in the down position.
Figure 5:
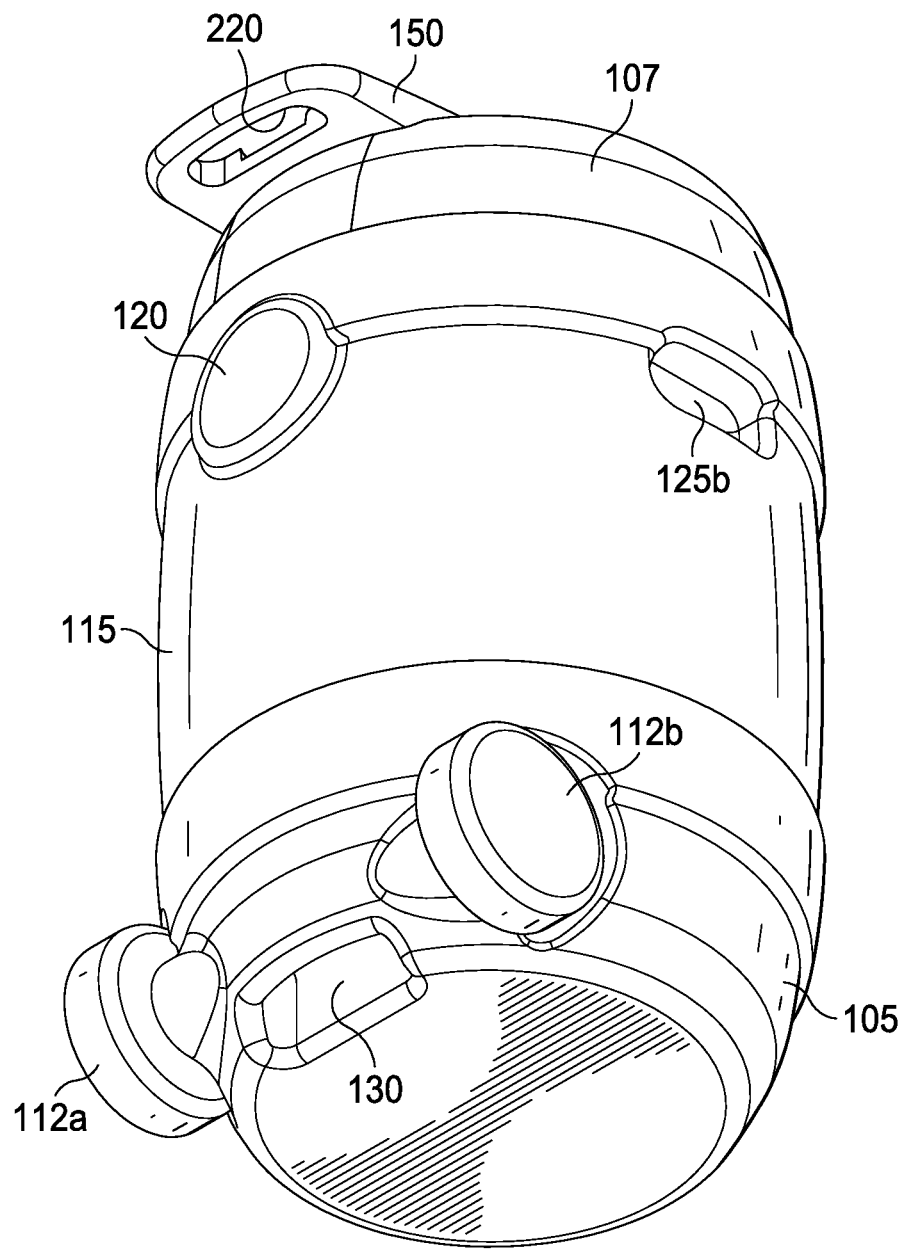
FIG. 5 is a bottom perspective view of the entire portable container with the handle in the down locked position.
Figure 6:
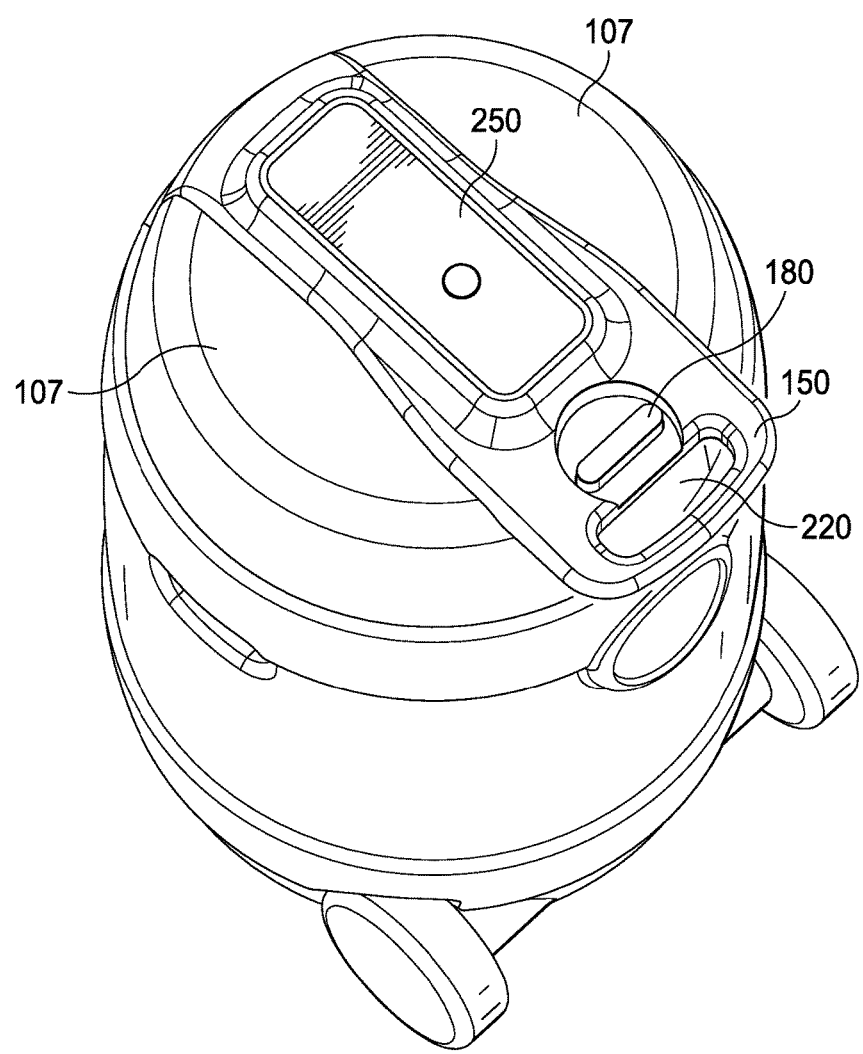
FIG. 6 is a top view of the entire portable container with the handle in the down locked position.
Figure 7:
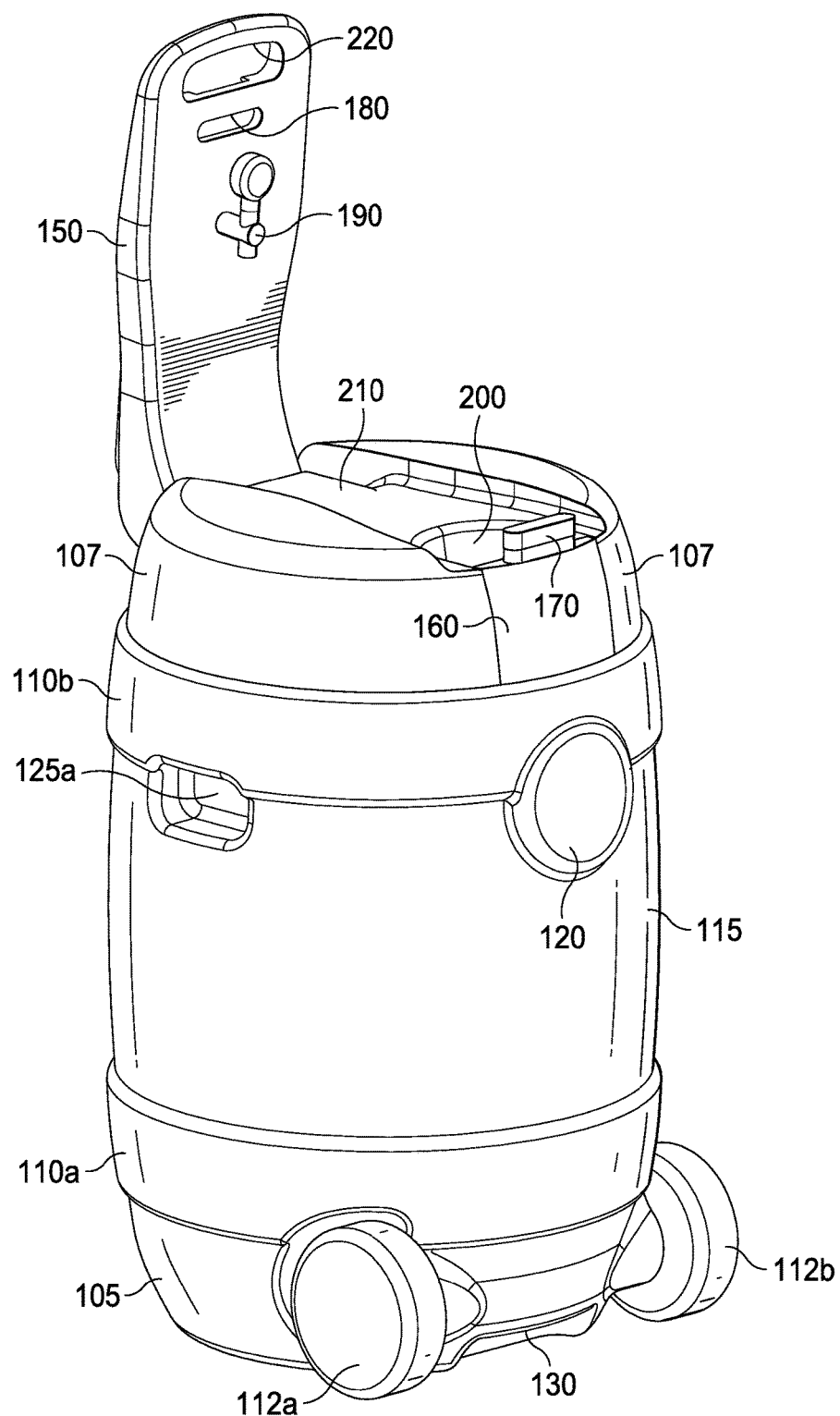
FIG. 7 is a perspective view of the entire portable container with the handle extended in the up position for dispensing beverages.
Figure 8:
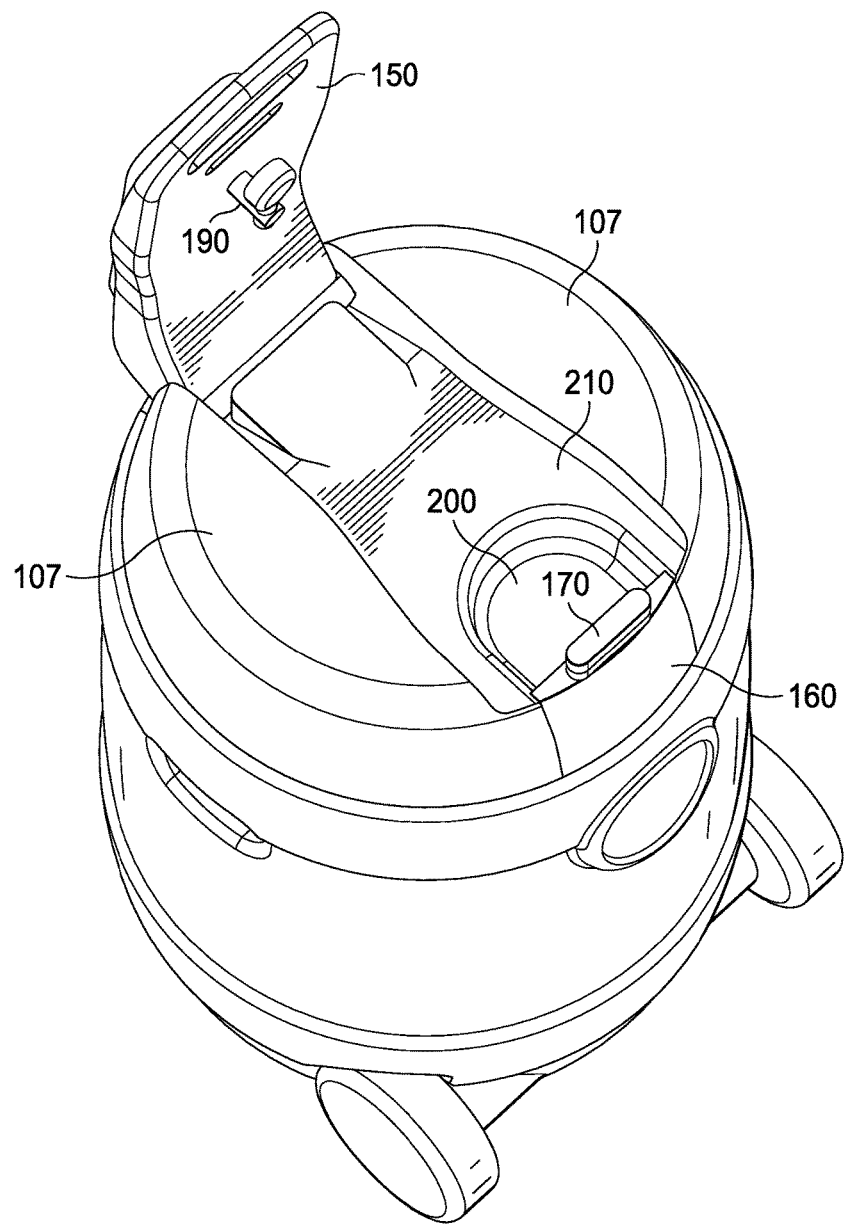
FIG. 8 is a top view of the entire portable container with the handle extended in the up position for dispensing beverages.
Figure 9:
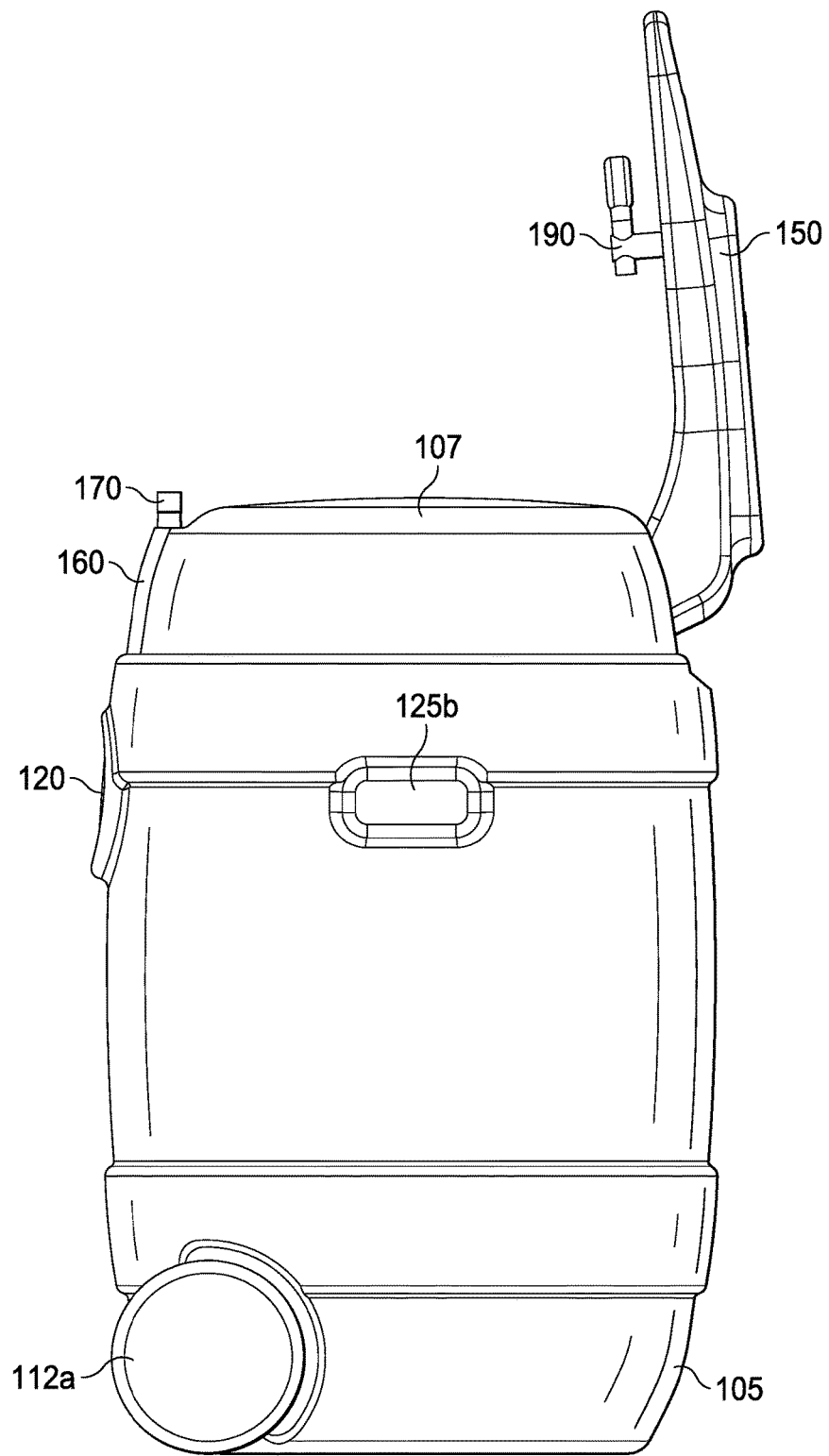
FIG. 9 a symmetrical side view of the entire portable container, with the left side view being a mirror image of the right side view, and the handle extended in the up position for dispensing beverages.
Figure 10:
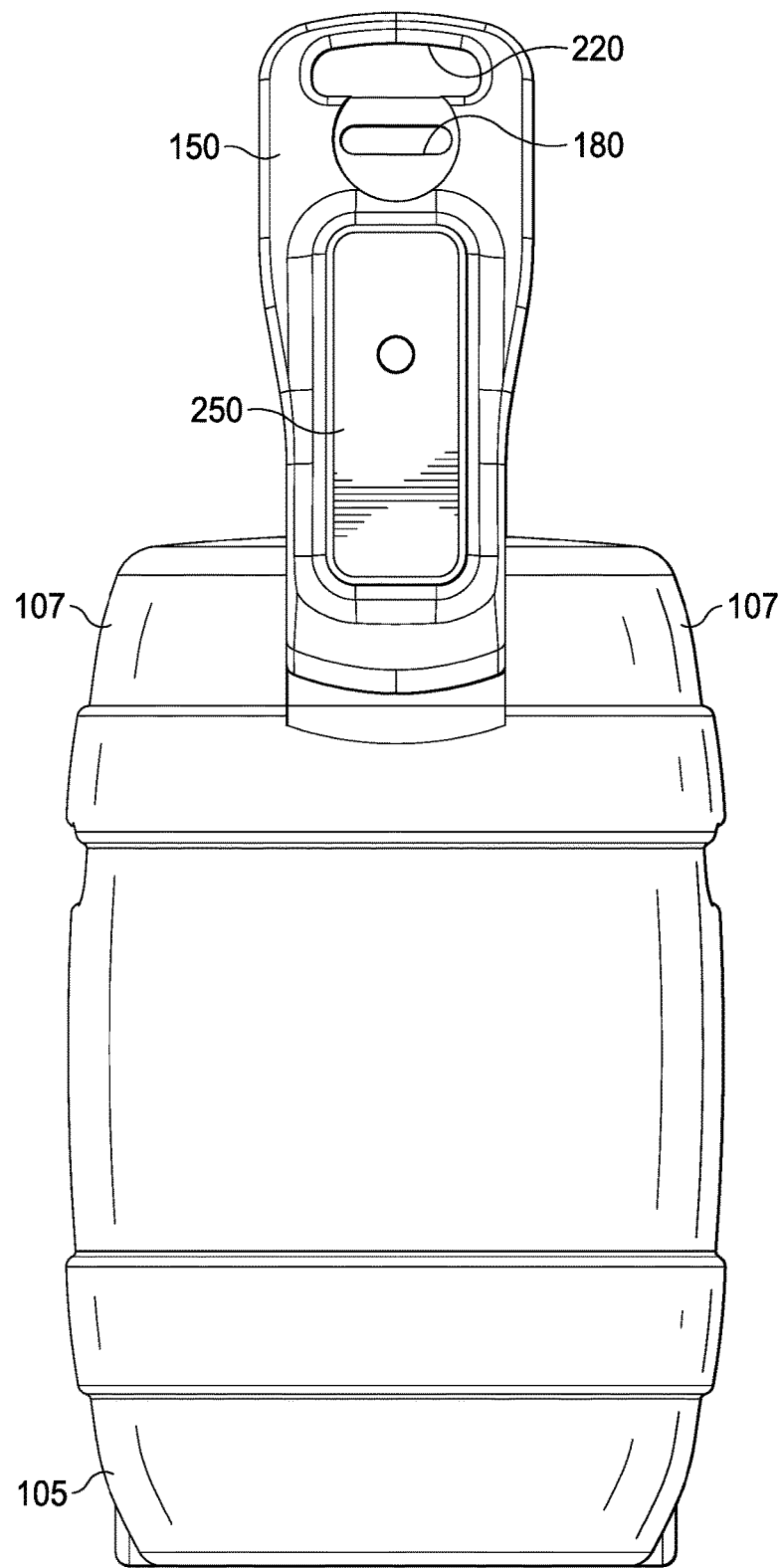
FIG. 10 is a back view of the entire portable container with the handle extended in the up position for dispensing beverages.
Figure 11:
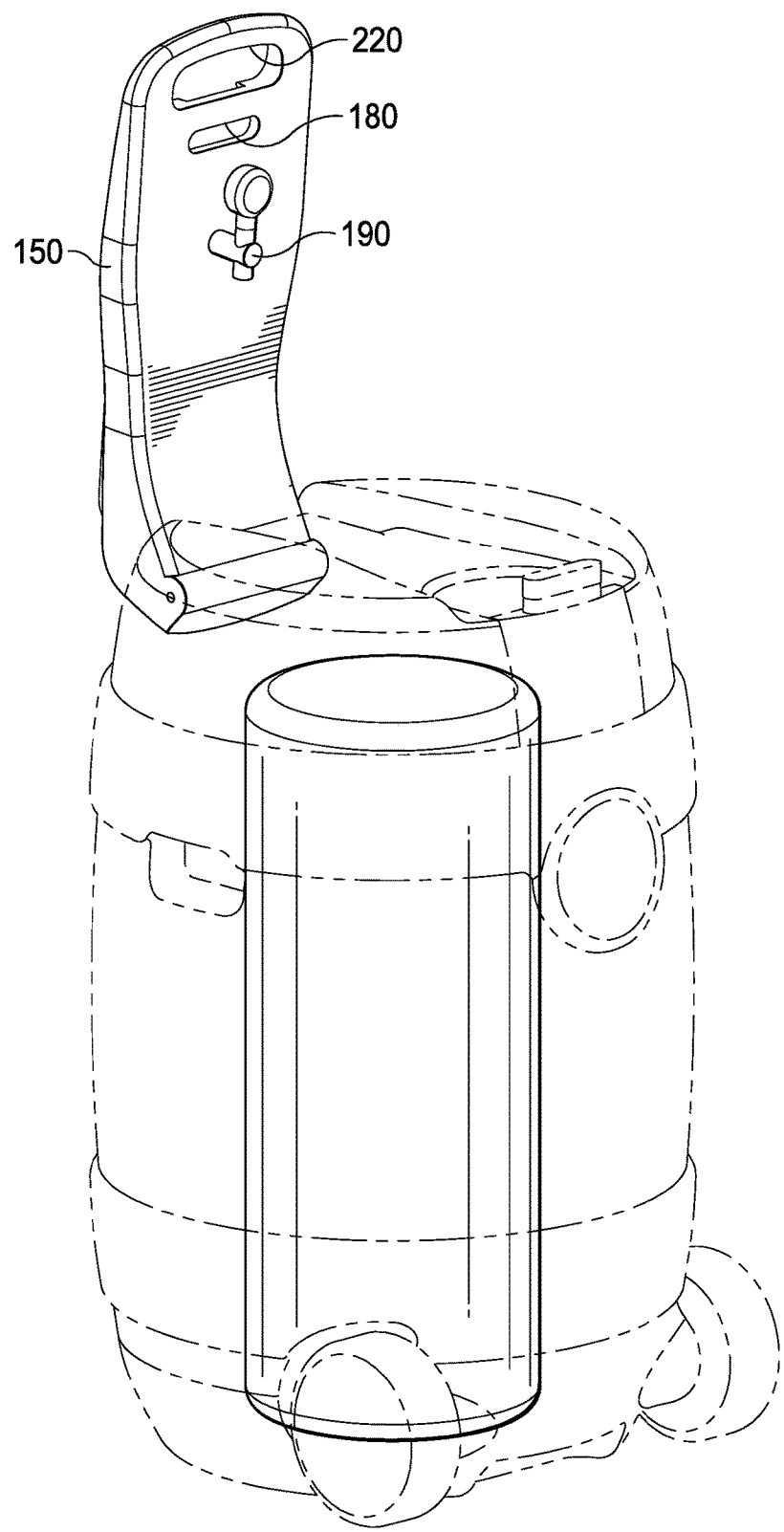
FIG. 11 is a cut away of FIG. 7 to show the placement of a Sixth Barrel or Cornelius kegs inside the portable container.
Figure 12:
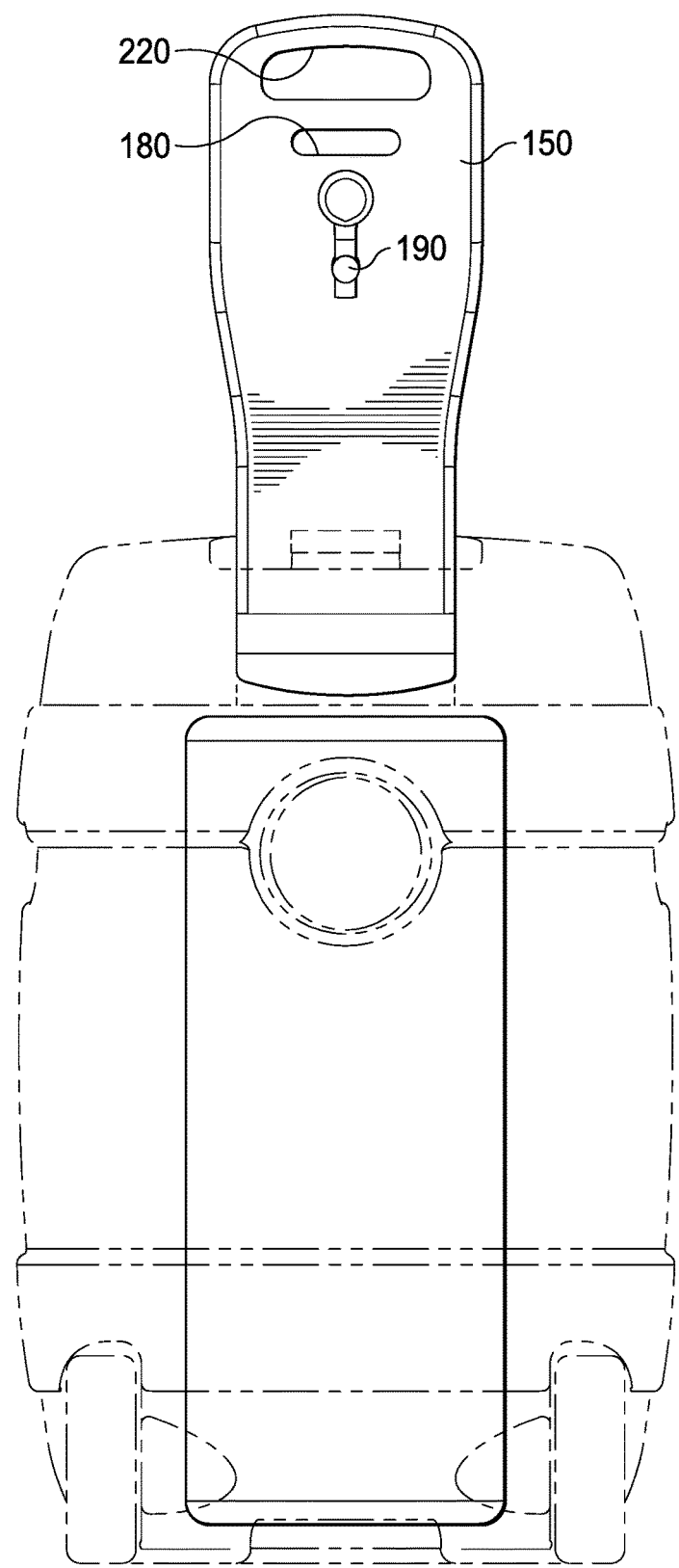
FIG. 12 is a cut away of FIG. 10 to show the placement of a Sixth Barrel or Cornelius keg inside the portable container.
Figure 13:
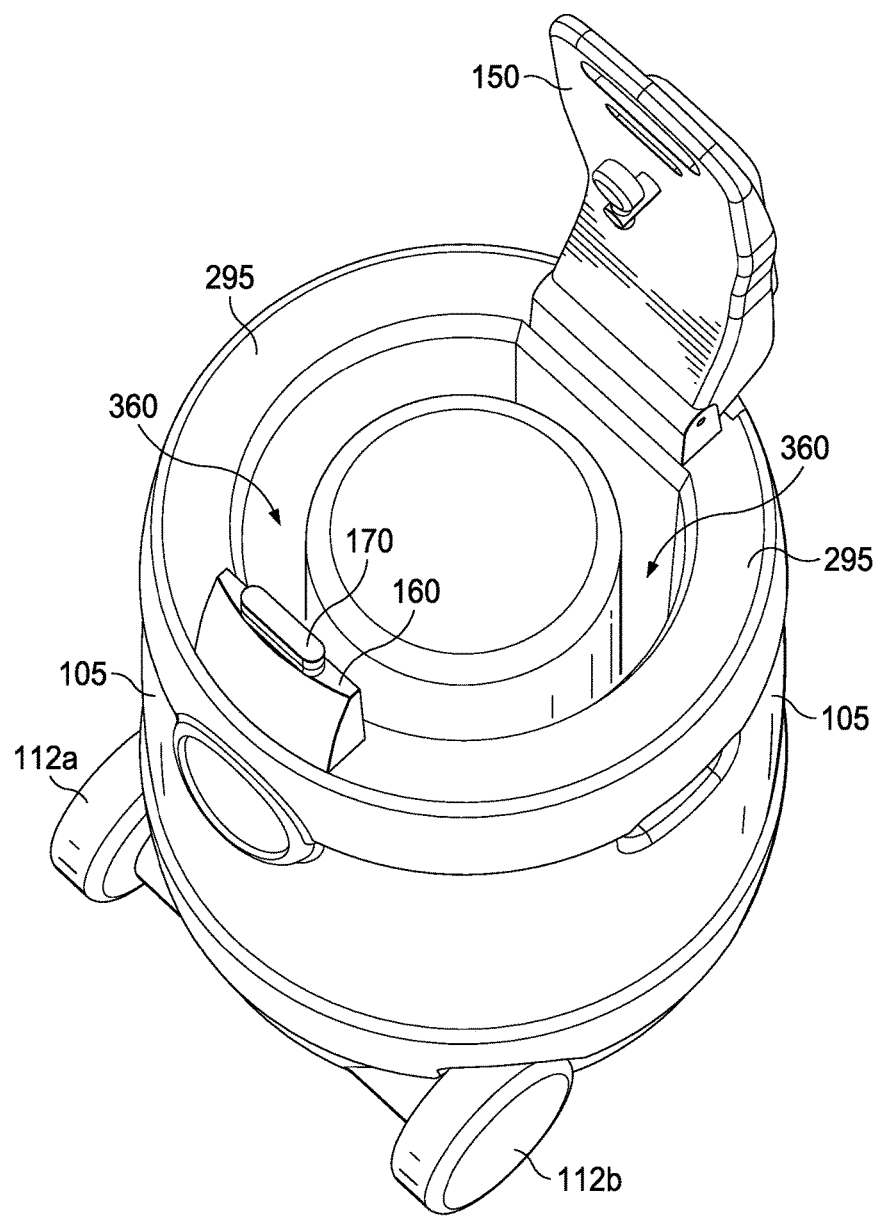
FIG. 13 is a top view of the portable container with the top of the portable container removed to show the placement of a Sixth Barrel or Cornelius keg inside the portable container.
Figure 14:
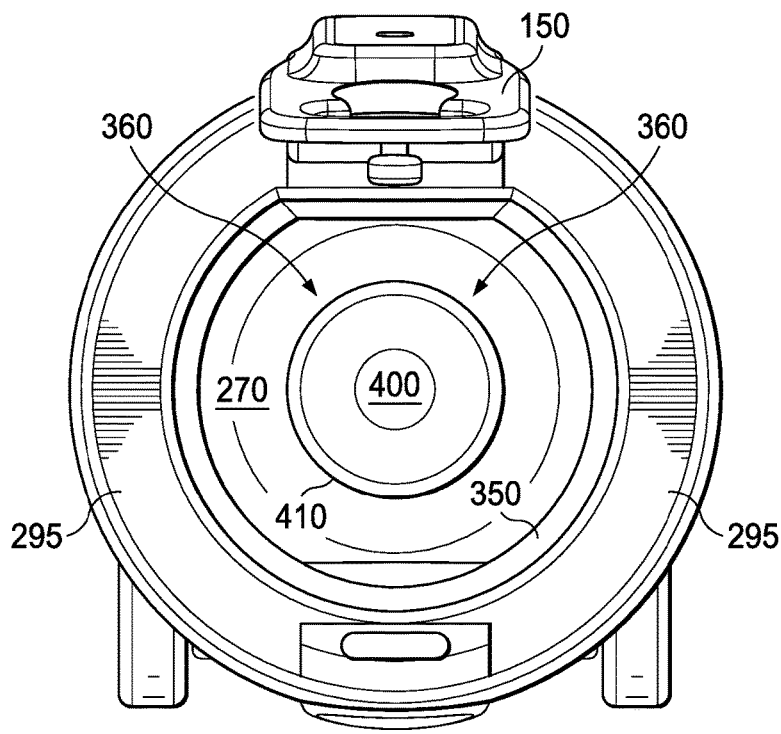
FIG. 14 is a top view of the portable container with the top of the portable container removed without a Sixth Barrel or Cornelius keg inside the portable container.
Figure 16:
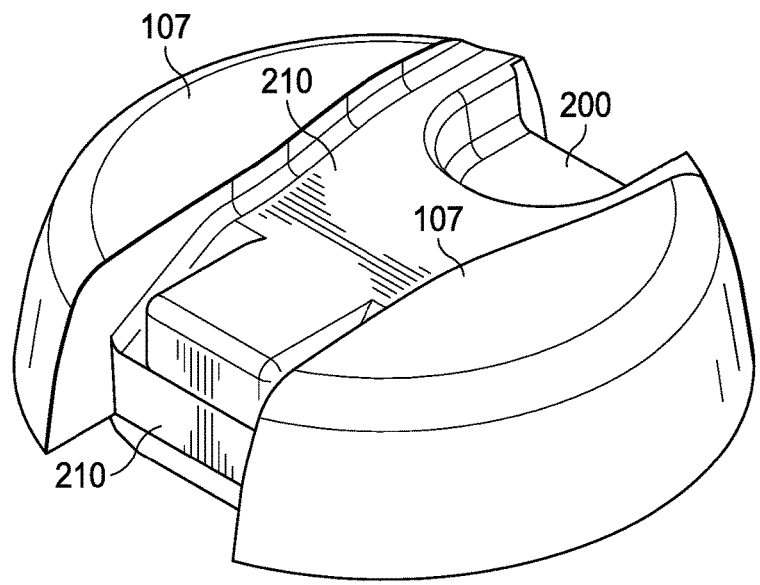
FIG. 16 is a perspective top view of the removable lid of the portable container without the handle attached.
Figure 15:
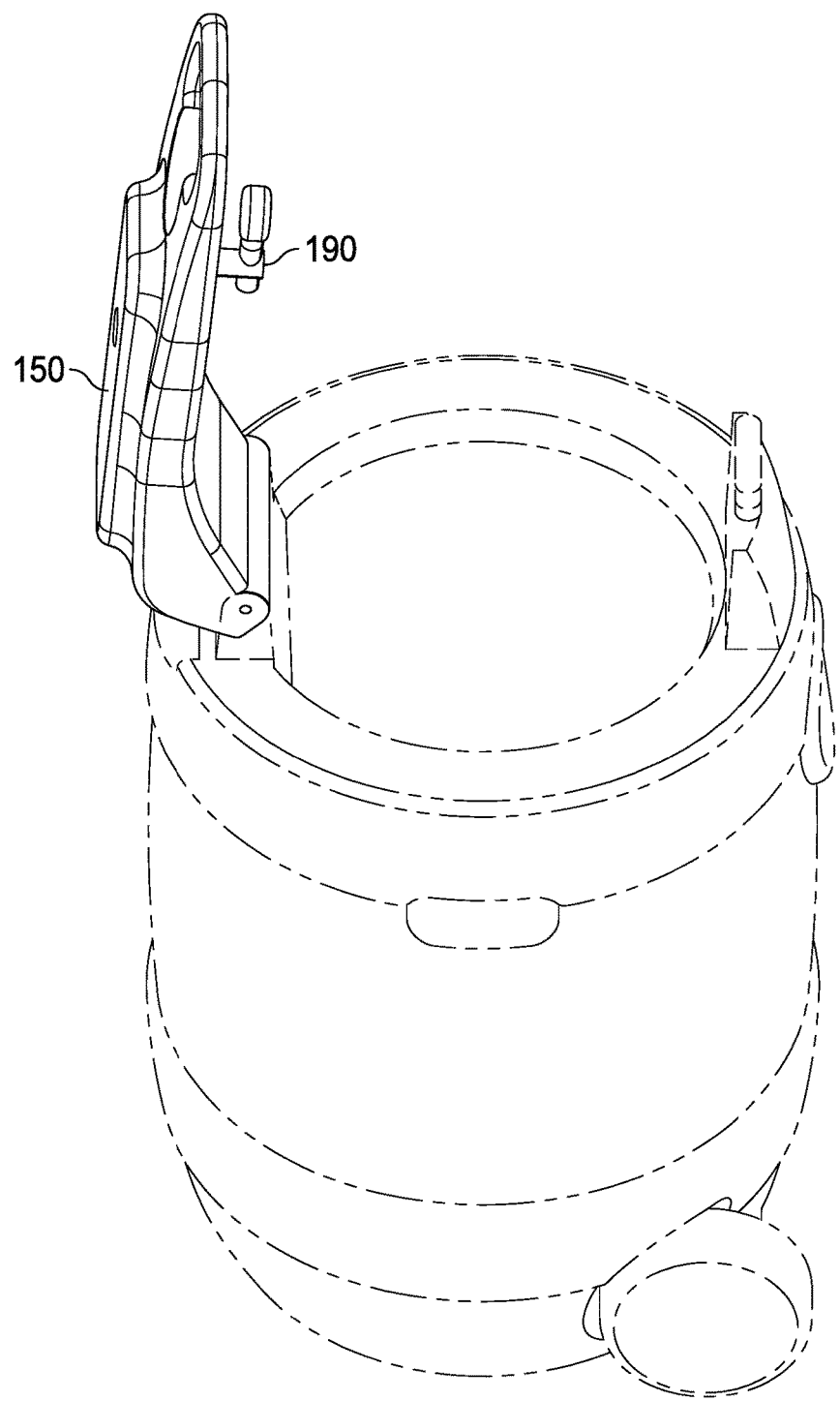
FIG. 15 is a cut away of FIG. 7 to show the inside of the portable container without a Sixth Barrel or Cornelius keg inside the portable container.
Figure 17:
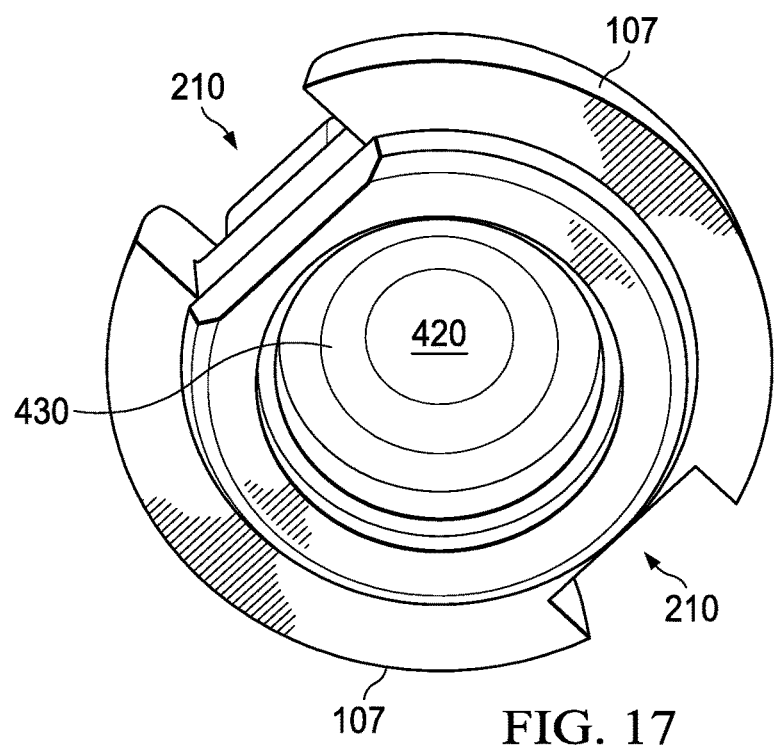
FIG. 17 is a perspective bottom view of the removable lid of the portable container.
Figure 18:
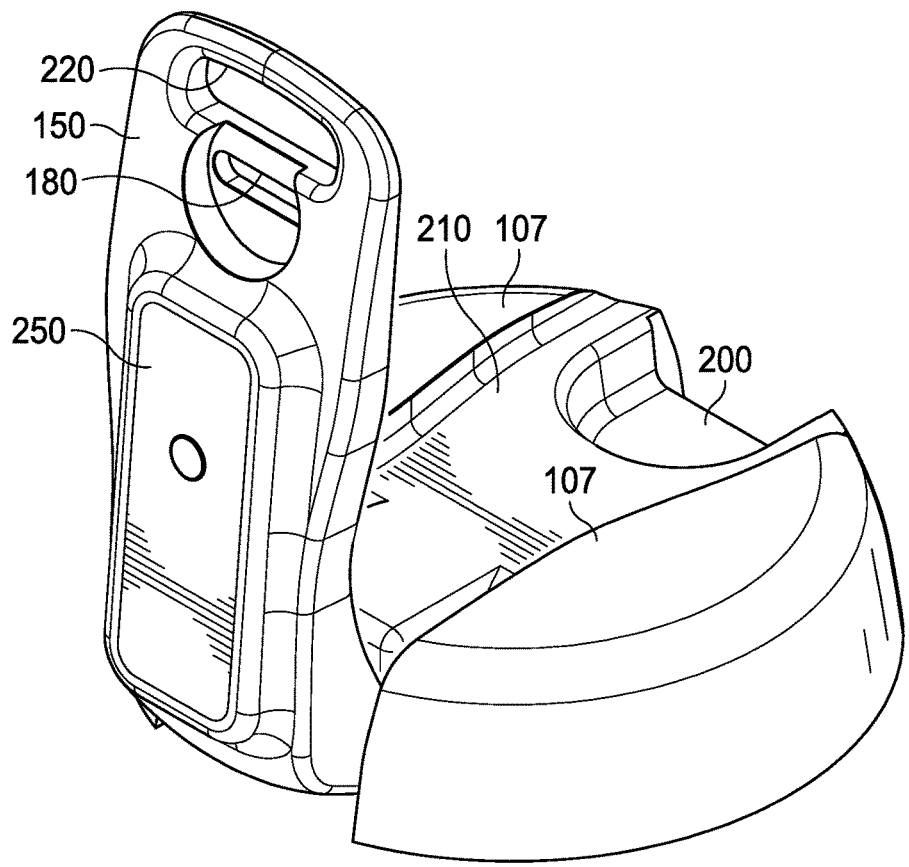
FIG. 18 is a perspective top view of the removable lid of the portable container with the handle attached and extended in the up position.
Figure 19:
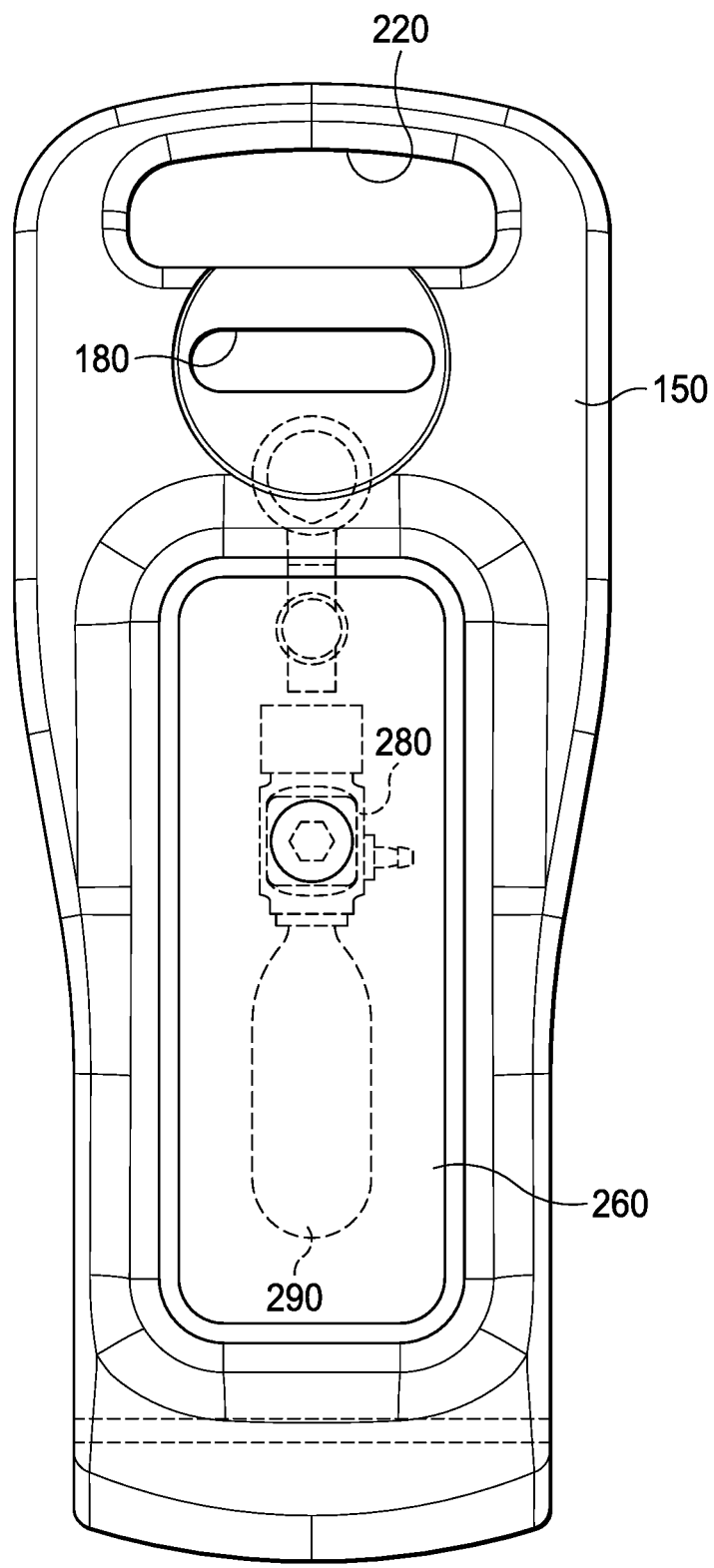
FIG. 19 is a back cut away view of the handle showing the placement of the tap and the $CO_2$ container.
Figure 20:
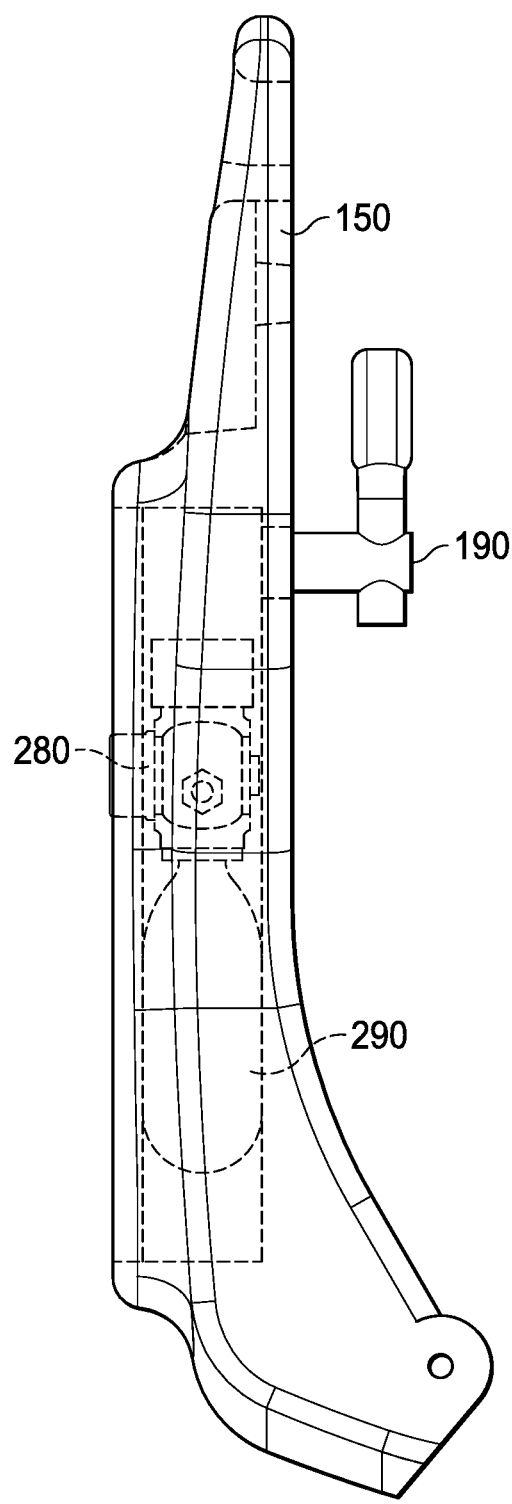
FIG. 20 is a side cut away view of the handle showing the placement of the tap and the $CO_2$ container.
Figure 21:
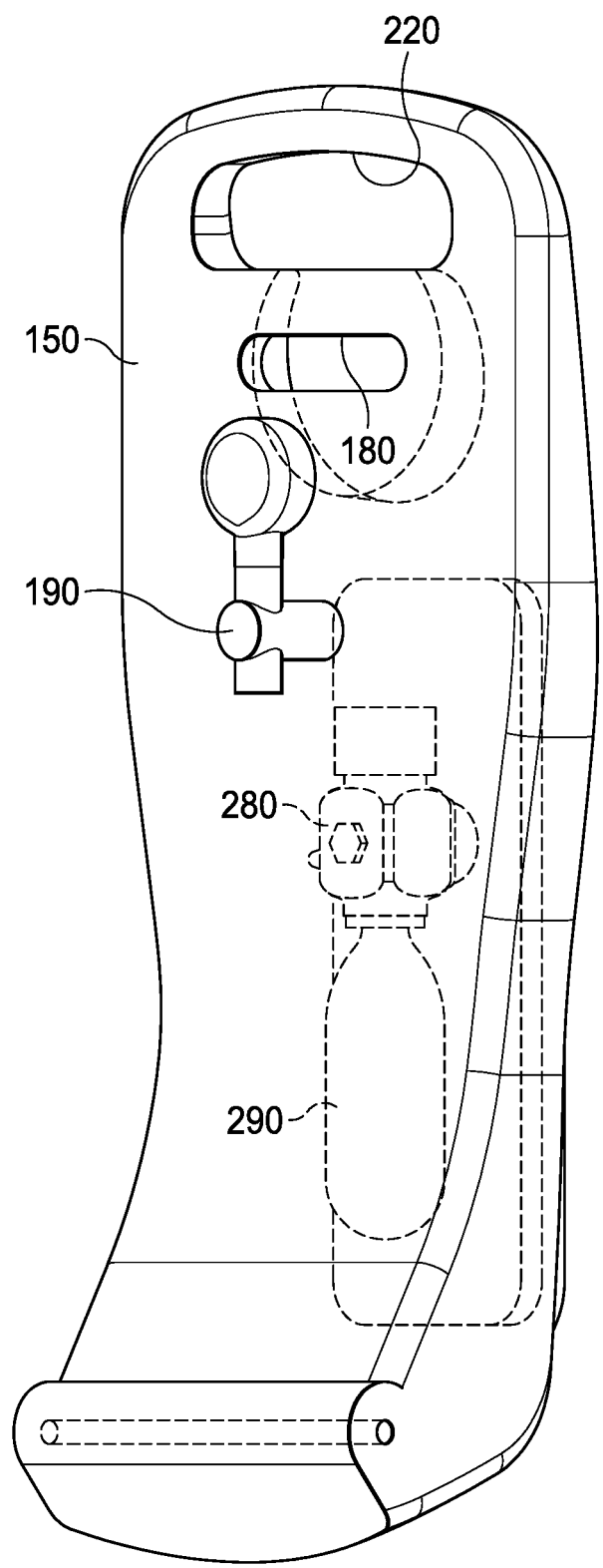
FIG. 21 is a front perspective cut away view of the handle showing the placement of the tap and the $CO_2$ container.

Referring to FIGS. 1-6, a portable container 100 is provided for transporting a Sixth Barrel or Cornelius keg and dispensing a beverage. The portable container 100 has a lower receiver portion 105 and a removable lid 107. The lower receiver 105 portion has a pair of bands, a lower band 110a and an upper band 110b, extending around the exterior circumference of the lower receiver 105. The exterior surface area of the lower receiver 105 between the lower band 110a and the upper band 110b is a marking and branding area 115. The marking and branding area 115 has a smooth and flat surface that is adaptive to receive a wrap, band, sticker, or other covering bearing a message, theme, or advertisement (not shown). The lower receiver 105 has a badge button 120 that is adapted to receive a badge that is secured to the lower receiver 105 by adhesive, magnetic, or by frictional attachment. The lower receiver 105 has a pair of side handles 125a, 125b for grasping the portable container 100. The portable container 100 has a pair of wheels 110a, 110b, on the front side of the portable container 100. The lower receiver 105 also has a lower handle 130 on the front side of the receiver 105 between the pair of wheels 110a, 110b, as shown in FIGS. 2 and 5.

Referring to FIGS. 7-10 shows the portable container 100 with the handle 150 extended in the up position to dispense a beverage. The removable lid 107 frictionally engages the lower receiver portion 105. The lower receiver 105 has an extension 160 that is integrated and part of the lower receiver 105 at the front of the lower receiver 105. On top of the extension 160 there is a locking toggle 170. When the handle 150 is in the down position, the locking toggle 170 fits through a locking slot 180 in the handle. The locking toggle 170 can then be rotated to lock the handle in place thereby securing the lid 107 to the lower receiver 105. The handle 150 is pivotally attached by an axel to the back of the lower receiver 105.

The handle 150 has a bottom side that lies flush against the lid 107 when the handle 150 is in the down position. When the handle 150 is extended in the up position there is a faucet 190 for dispensing beverages located on the bottom side of the handle 150. The lid 107 has a faucet recess 200 to accommodate the faucet 190 when the handle 150 is in the down position. The lid 107 also has a handle recess 210 extending from the back of the lid 107 to the front of the lid 107. The handle recess 210 frictionally engages the handle 150 when it is in the down position. The handle 150 has a hand slot 220 near its distal end. The handle 150 and wheels 110a,110b, are located on opposite sides of the lower receiver 105 which permits safe and easy movement of the portable container by lowering the center of gravity of the load below the handle 150 during transport.

The handle 150 has a top side. The top side has a removable panel 250 that covers a component recess 260. The component recess accommodates a regulator 280 and a $CO_2$ cartridge 290. Regulators and $CO_2$ cartridges are well known in the field and can be obtained from suppliers such as Leland Limited. The $CO_2$ cartridge 290 is threadably attached to the regulator 280 so that it can be easily replaced when the $CO_2$ runs low or is depleted. A first flexible tube (not shown) extends from the regulator 280 to the keg tap 300 to push $CO_2$ into the Sixth Barrel or Cornelius keg and displace the liquid beverage. A second flexible tube (not shown) extends from the keg tap 300 to the faucet 190 for dispensing the displaced liquid beverage from the Sixth Barrel or Cornelius keg.

The lid 107 frictionally engages the lower receiver 105. The lid 107 may be removed from the lower receiver 105 when the handle 150 is in the up position thereby providing access to an internal compartment 350. The internal compartment 350 has a bottom 270 with generally circular sidewalls 360 extending from the bottom 270 to the top rim 295 of the lower receiver 105. The sidewalls 360 are insulated in order to minimize the temperature differential between the internal compartment 350 and the exterior and minimize air exchange. The insulation can be an air barrier, polyurethane foam, or foam. The bottom 270 of the internal compartment 350 has a first substantially circular mating ridge 400 and a second substantially circular mating ridge 410. The first mating ridge 400 and the second mating ridge 410 extend substantially perpendicular to the bottom 270. The first mating ridge 400 will frictionally mate with a Sixth Barrel to hold it in place. The second mating ridge will frictionally mate with a Cornelius Keg to hold it in place. The space between either the Sixth Barrel or the Cornelius Keg and the sidewall 360 can be filed with ice, dry ice, an ice blanket or some other cooling medium to chill the keg. The lower receiver 105 has a drain plug (not shown) adjacent to the bottom 270 that has a channel extending from the internal compartment 350 to the exterior to allow fluids to be drained from the internal compartment 350.

When the lid 107 is frictionally attached to the lower receiver 105 the bottom side of the lid 107 seals off the internal compartment 350. The bottom side of the lid 107 has a first mating recess 420 and a second mating recess 430. The first mating recess 420 and the second mating recess 430 indent substantially perpendicular to the bottom side of the lid 107. The first mating recess 420 will frictionally mate with a Sixth Barrel to hold it in place. The second mating recess 430 will frictionally mate with a Cornelius Keg to hold it in place. The lid 107 is insulated to maintain a temperature differential between the temperature of the interior compartment 350 and the external temperature. The insulation can be an air barrier, polyurethane foam, or foam.

Variations or modifications to the subject matter of this invention may occur to those skilled in the art upon reviewing the invention as described herein. Such variations are intended to be encompassed within the scope of any claims of this invention that may issue upon this application. The description of the preferred embodiment, as depicted in the drawings, is set forth for illustrative purposes only and should not limit the scope of any claims that may issue upon this application.

Therefore, having described and disclosed our invention, at least the following is claimed:

1. A portable container comprising:
    a lower receiver with an internal compartment that has a bottom and substantially circular sidewalls extending from the bottom to a rim at the top of the lower receiver, and a pair of wheels;
    a removable lid that frictionally engages the lower receiver;
    a handle that is pivotally attached to the lower receiver by an axel, the handle has a down position and an up position, and a hand slot;
    wherein the handle has a regulator and a supply of CO2 contained in a component recess in the handle;
    locking means for securing the handle to the lower receiver in the down position;
    securing means for holding a keg in place in the internal compartment;
    a keg tap located in the lower receiver that is removable attached to a keg; and,
    a faucet for dispensing a beverage.

2. A portable container according to claim 1 wherein the locking means includes:
    an extension that protrudes above the rim of the lower receiver with a locking toggle on its distal end that fits through a locking slot in the handle so that the locking toggle can be rotated to lock the handle in the down position.

3. A portable container according to claim 1 wherein the securing means includes:
    a first substantially circular mating ridge and a second substantially circular mating ridge on the bottom of the internal compartment that are adapted to frictionally mate with a keg to hold it in place; and
    a first substantially circular mating recess and a second substantially circular mating recess on the bottom side of the lid that are adapted to frictionally mate with a keg to hold it in place.

4. A portable container according to claim 1 wherein the top of the lid has a handle recess extending from the back of the lid adjacent to the handle axel to the front of the lid adjacent to an extension that protrudes above the rim; and, the handle frictionally engages the handle recess when the handle is in the down position.

5. A portable container according to claim 1 wherein the handle is attached to the lower receiver substantially opposite the pair of wheels.

6. A portable container according to claim 1 wherein the lower receiver has an upper band and a lower band, the pair of bands extending around the exterior circumference of the lower receiver; and,
    a message area extending around the exterior circumference of the lower receiver in between the upper band and the lower band, wherein the surface of the message area is adaptive to receiving a message, theme, or advertisement.

7. A portable container according to claim 1 further comprising:
    a badge button on the exterior of the lower receiver that is adapted to receive a badge.

8. A portable container according to claim 1 wherein the lid has faucet recess to accommodate the faucet when the handle is in the down position.

9. A portable container according to claim 1 wherein the lower receiver and the lid are insulated to maintain a temperature differential between the temperature of the interior compartment and the external ambient temperature.

10. A portable container comprising:
    a lower receiver with an internal compartment that has a bottom and substantially circular sidewalls extending from the bottom to a rim at the top of the lower receiver, and a pair of wheels;
    a removable lid that frictionally engages the lower receiver;
    a handle that is pivotally attached to the lower receiver by an axel, the handle has a down position and an up position, and a hand slot; and,
    locking means for securing the handle to the lower receiver in the down position;
    a regulator and a supply of CO2 contained in a component recess in the handle;
    a keg tap located in the lower receiver that is removable attached to a keg; and,
    a faucet for dispensing a beverage.

11. A portable container according to claim 10 wherein the locking means includes:
- an extension that protrudes above the rim of the lower receiver with a locking toggle on its distal end that fits through a locking slot in the handle so that the locking toggle can be rotated to lock the handle in the down position.

12. A portable container comprising:
- a lower receiver with an internal compartment that has a bottom and substantially circular sidewalls extending from the bottom to a rim at the top of the lower receiver, and a pair of wheels;
- a removable lid that frictionally engages the lower receiver;
- a handle that is pivotally attached to the lower receiver by an axel, the handle has a down position and an up position, and a hand slot;
- an extension that protrudes above the rim of the lower receiver with a locking toggle on its distal end that fits through a locking slot in the handle so that the locking toggle can be rotated to lock the handle in the down position;
- a first substantially circular mating ridge and a second substantially circular mating ridge on the bottom of the internal compartment that are adapted to frictionally mate with a keg to hold it in place; and
- a first substantially circular mating recess and a second substantially circular mating recess on the bottom side of the lid that are adapted to frictionally mate with a keg to hold it in place;
- a regulator and a supply of $CO_2$ contained in a component recess in the handle;
- a keg tap located in the lower receiver that is removable attached to a keg; and,
- a faucet for dispensing a beverage.

\* \* \* \* \*